United States Patent Office 3,826,633
Patented July 30, 1974

3,826,633
FUEL ADDITIVES
Marvin D. Coon, Vallejo, Calif., assignor to Chevron Research Company, San Francisco, Calif.
No Drawing. Filed Oct. 24, 1972, Ser. No. 296,372
Int. Cl. C10l 1/24
U.S. Cl. 44—72                 5 Claims

ABSTRACT OF THE DISCLOSURE

The present invention is concerned with more effective deposit control additives for hydrocarbonaceous fuels which are hydrocarbylaminopolymethylenesulfonic acids. These additives are the reaction products produced by sulfoalkylating certain hydrocarbyl-substituted amines. The sulfoalkylation can be accomplished by reacting the hydrocarbyl-substituted amines with alkane sultones in approximate mol ratio 2–1:1–2. The hydrocarbyl substituent contains at least about 30 carbon atoms.

BACKGROUND OF THE INVENTION

Field of the Invention

The smooth and efficient operation of internal combustion engines with minimum pollution requires a high degree of cleanliness in the fuel intake system, valves, cylinders, piston heads and crankcase. Consequently, additives are incorporated into fuels to reduce deposits in the intake system and other engine parts. Furthermore, when such additives find their way into the crankcase it would be advantageous if they also were capable of decreasing crankcase sludge formation, i.e. display the ability to maintain overall engine cleanliness. By maintaining various engine parts in clean condition, such additives reduce incomplete combustion, contribute to longer engine life and improved fuel performance, and reduce the production of pollutants.

SUMMARY OF THE INVENTION

The hydrocarbylaminopolymethylenesulfonic acids are effective deposit control additives for hydrocarbonaceous fuels. The hydrocarbyl substituent contains at least 30 carbon atoms and preferably less than 300 carbon atoms and is an aliphatic, alicyclic, aromatic group, or combination of these. The hydrocarbylaminopolymethylenesulfonic acids can be prepared by reacting a hydrocarbylamino with an alkane sultone. The alkane sultones are cyclic anhydrides of hydroxysulfonic acids.

DETAILED DESCRIPTION OF THE INVENTION

Hydrocarbylaminopolymethylfonic acids are sulfonated hydrocarbyl-substituted amines which can be obtained as the reaction product of hydrocarbyl-substituted amines with alkane sultones. They are fuel additives capable of providing superior engine cleanliness.

Hydrocarbyl, as used herein, denotes an organic radical composed of carbon and hydrogen (except for minor, sometimes adventitious amounts of other elements such as oxygen), which may be aliphatic, alicyclic, aromatic or combinations thereof, e.g., aralkyl. Preferably, the hydrocarbyl group will be relatively free of aliphatic unsaturation, i.e., ethylenic and acetylenic, particularly acetylenic. The hydrocarbyl substituent will contain at least 30 carbon atoms and preferably less than 300 carbon atoms. When the hydrocarbyl groups are of lower molecular weight, the average number of hydrocarbyl substituents in a given amine may be greater than one. The hydrocarbyl groups are preferably from 0 to 2 sites of ethylenic unsaturation and most preferably from 0 to 1 such site. Hydrocarbyl groups derived from a polyolefin, itself derived from olefins (normally 1-olefins) of from 2 to 6 carbon atoms (ethylene being copolymerized with an olefin of at least 3 carbon atoms), or from a high molecular weight petroleum-derived hydrocarbon are preferred, and of these polyisobutene is most preferred.

The hydrocarbyl substituents will have molecular weights from 420 to about 10,000. Illustrative sources for the high molecular weight hydrocarbyl substituents are petroleum mineral oils, such as naphthenic bright stocks, polypropylene, polyisobutylene, poly-1-butene, copolymers of ethylene and propylene, poly-1-pentene, poly-4-methyl-1-pentene, poly-1-hexene, poly-3-methylbutene-1, etc. The molecular weights referred to herein are average molecular weights.

The hydrocarbyl-substituted amines are derived from monoamines and polyamines, preferably alkylene polyamines and polyalkylene polyamines by, for example, reaction of the halongated hydrocarbon with the amine. Examples of such amines include, methylamine, ammonia, ethylene diamine, 2-aminoethyl piperazine, diethylene triamine, di(trimethylene) triamine, dipropylene triamine, triethylene tetramine, tripropylene tetramine, tetraethylene pentamine, pentaethylene hexamine, etc. The named amines encompass substituted and alkyl-substituted amines, e.g. N-methylethylene diamine, N,N'-dimethylethylene diamine, N,N-dimethylpropylene diamine, N-hydroxyethylethylene diamine, etc. Amines having up to about 6–8 amino nitrogens and up to about 20 carbon atoms are especially preferred. The hydrocarbyl-substituted amines are prepared, in general, by the reaction of a halogen-substituted hydrocarbon with the amine. Details of such preparations and further description of hydrocarbyl-substituted amines can be found in Honnen and Anderson U.S. Pat. 3,565,804.

The hydrocarbyl substituents in the hydrocarbyl-substituted polyamine can be found at any nitrogen atom which is capable of receiving it, since these nitrogen atoms are in general inequivalent by symmetry, the expression of the substituted polyamine in terms of a given chemical structure is impractical. In general, the substituted polyamines which find use in this invention are mixtures of mono, and poly-substituted polyamines with hydrocarbyl groups substituted are various equivalent and inequivalent nitrogen atoms. The reaction which yields the polymethylenesulfonic acids of the present invention can occur at any nitrogen atom or several nitrogen atoms. Consequently, it would be both impractical and confusing to try to express the polymethylenesulfonic acid in terms of a single structure or class of structures. However, for the case of amino-substituted monoamine reacted with propane sultone, the proposed reaction scheme is believed to be expressible as:

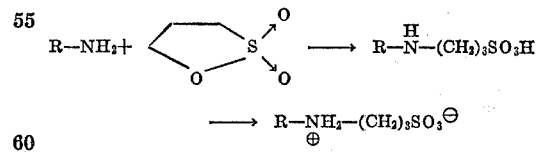

wherein R is the previously described hydrocarbyl substituent. It is believed that the product exists as the internal salt, or zwitterion, illustrated. The reaction can occur at primary, secondary, or tertiary amino nitrogen, in the latter case the existence of a zwitterionic product is more certain.

The sultones are cyclic anhydrides of hydroxysulfonic acids, such as 3-hydroxy-1-propanesulfonic acid sultone (propane sultone), 4-hydroxy - 1 - butanesulfonic acid sultone (butane sultone), etc. The five and six membered ring alkane sultones, and their alkylated derivatives, are highly reactive and versatile sulfoalkylating agents. Examples of the sultone finding use within the practice of the present invention include 3-hydroxy-1-propanesulfonic acid sultone (propane sultone), 4 - hydroxy - 1 - butanesulfonic acid sultone (butane sultone), 5-hydroxy-1-pentanesulfonic acid sultone, 3 - hydroxy - 1 - isobutanesulfonic acid sultone, etc. The propane and butane sultones are preferred, and of these propane sultone is particularly preferred. The sultones are prepared by sulfonation of alkenes. 5-membered ring sultone can in some cases be obtained in fair yield from the corresponding branched alkene, e.g. 3-methyl-1-butene, 3,3-dimethyl-1-butene, 2,3,3-trimethyl-1-butene, 4-methyl-2-pentene, 4,4-dimethyl-2-pentene, etc., by sulfonation, as well as by sulfonation of certain halogenated compounds, unsaturated ketones, etc. (Sulfonation and Related Reactions, E. E. Gilbert, Interscience Publishers, 1965, N.Y.). Propane sultone is commercially available (Shell Chemical Company, Distillation Products Industries and Aldrich Chemical Company) and is prepared by vacuum distilling 3-hydroxy-propanesulfonic acid.

Illustrative hydrocarbylaminopolymethylenesulfonic acids produced from the sulfoalkylation of a hydrocarbyl amine are N-hydrocarbylmethylamine-N-dimethylenesulfonic acid,
N-hydrocarbylethylenediamine-N-trimethylenesulfonic acid,
N,N'-dihydrocarbyl-N'-methylethylenediamine-N-tetramethylenesulfonic acid,
N,N'-dihydrocarbyldiethylenetriamine-N,N''-di(dimethylenesulfonic acid),
N''-hydrocarbyltriethylenetetramine-N,N'''-di(trimethylenesulfonic acid), etc.

Some hydrocarbylaminomethylenesulfonic acids produced from the sulfoalkylation of a hydrocarbyl amine with an alkyl sultone are N,N'-dihydrocarbyl-N-methyl-diethylenetriamine-N'', N''-di(methyltrimethylenesulfonic acid),
N-hydrocarbyl-N-ethyltetrapropylenepentamine-N'', N'''-di(dimethyltrimethylenesulfonic acid), etc.

Method of Preparation

The 5-6-membered ring alkane sultones and their alkyl derivatives, are highly reactive and versatile sulfoalkalating agents. They react readily with many nucleophiles, but propane sultone, with its 5-membered ring, reacts most readily. To prepare the fuel additives of this invention one can proceed by mixing the hydrocarbyl-substituted amine with an alkane sultone in a suitable hydrocarbon solvent at room temperature in the mol ratio of about 2:1 to 1:2. Alternatively, the alkane sultone can be added drop-wise to the constantly stirred reaction mixture at a temperature of about 80–110° C.

EXAMPLE 1

Into a flask was charged 1000 g. of polyisobuteneylethylenediamine in 60% concentration in a neutral oil (number average molecular weight about 1400 and containing 1.55 weight percent nitrogen) and 73.2 g. of propane sultone. The mixture was refluxed in 450 ml. of xylene for 4 hours. The product was stripped of xylene, redissolved in hexane and separated with methanol.

EXAMPLE 2

50 g. of polyisobutenylethylenediamine in 60% concentration in neutral oil and 3.66 g. of propane sultone were mixed, and the mixture was refluxed in xylene for 4 hours. The xylene was evaporated via a rotary evaporator, finally going to high vacuum at 100° C. The product was dissolved in hexane, separated with methanol, and stripped in high vacuum at 100° C. 45.6 g. of product was obtained, containing 1.75% nitrogen and 1.6% sulfur by weight.

Compositions

Depending on the particular application of the compositions of this invention, the reaction may be carried out in the medium in which it will ultimately find use and be formed in concentrations which provide a concentrate of the dispersant composition. Thus, the final mixture may be in a form to be used directly upon dilution in fuels. The hydrocarbylaminopolymethylenesulfonic acids will generally be employed in hydrocarbonaceous base liquid fuels. They may be formulated as a concentrate, using a suitable solvent. Preferably, an aromatic hydrocarbon solvent, such as benzene, toluene, xylene or higher boiling aromatics or aromatic thinners. Aliphatic alcohols of about 3 to 5 carbon atoms, such as isopropanol, isobutanol, n-butanol, and the like, in combination with hydrocarbon solvents are also suitable for use with the polymethylenesulfonic acid additive. Other polymeric materials may be used in conjunction with the additives of this invention, e.g. polyisopropylene.

In the fuel, the concentration of the polymethylenesulfonic acids will generally be at least 10 p.p.m. and usually not more than 4000 p.p.m., more usually in the range of from about 10 to about 1000 p.p.m. In concentrates, they will generally be from about 1 to 50 weight percent, more usually from about 5 to 30 weight percent, and more generally not exceeding 80 weight percent.

In gasoline fuels, other fuel additives may also be included such as anti-knock agents, e.g. tetramethyl lead, tetarethyl lead. Also included may be lead scavangers such as arylhalides, e.g. dichlorobenzene or alkylhalides, e.g. ethylenedibromide. A non-volatile lubricating mineral oil, e.g. petroleum spray oil, particularly a refined naphthenic lubricating oil having a viscosity at 100° F. of 1000 to 2000 SUS, is a suitable oil additive for the gasoline composition used with the hydrocarbylaminopolymethylenesulfonic acids of this invention and its use is preferred. Polymeric materials as mentioned above, such as polyolefins and glycols such as polypropylene glycol can also be used. These oils are believed to act as the carrier for the dispersant and assist in removing and preventing deposits. They are employed in amounts of from about 0.05 to 0.5 percent by volume, based on the final gasoline composition.

Evaluation

To measure the ability of a gasoline additive to insure engine cleanliness, the following Laboratory Dispersancy Test (LDT) is used. A laboratory solvent consisting of 25 percent xylene and 75 percent hexane by volume is used to prepare solutions of the additive to be tested. Solutions (25 ml.) are placed in one-ounce vials, of a given quantity of chloroform-soluble engine sludge is added (0.5 ml. of a solution containing 4 g. of sludge per 100 ml. of chloroform), and the vials are shaken vigorously for 5 seconds. The vials are allowed to stand for two hours then photographed to record the results. The cutoff concentration is the lowest concentration where the solution is able to suspend or disperse a reasonable amount of the material resulting in the solution having a dark and turbid appearance. An effective additive will have a low cutoff concentration and a poor additive will have a high cutoff concentration.

The precipitated engine sludge was obtained from engines in actual service by scraping areas containing heavy deposits of sludge. The sludge was washed with hexane to remove oil and hydrocarbon-soluble substances. The mixture was centrifuged and the hexane-soluble fraction decanted. A second washing with hexane was performed. The insolubles were stirred with chloroform, centrifuged, and the chloroform decantate stripped on a solvent stripper to give a dry, black, granular material. This is the material used in the LDT. The dry material was dissolved in chloroform before use to give a solution of the desired concentration.

TABLE I

| | LDT cut-off point in p.p.m. |
|---|---|
| Product of Example 1 | 25 |
| Starting amine of Example 1 | 400 |

The results of Table 1 show that the hydrocarbylaminopolymethylenesulfonic acid of Example 1 has a cut-off concentration of 25 p.p.m. which is vastly superior to the cut-off concentration of the hydrocarbyl-substituted polyamines starting material of Example 1. That is, 25 p.p.m. of the hydrocarbylaminopolymethylenesulfonic acid is capable of dispersing approximately the same amount of sludge-like material in the Laboratory Dispersancy Test as 400 p.p.m. of polyisobutenylethylenediamine which is itself a known dispersant additive for hydrocarbonaceous fuels.

This test illustrates the superiority of the hydrocarbylaminopolymethylenesulfonic acids as fuel additives. In addition to the illustrated additive, other reaction products formed from the specified reagents of the present invention are also known to perform as superior fuel additives. It is not possible to attempt a comprehesive catalog of such reactants or to describe the invention in terms of specific chemical names of such reactants and reaction products without producing a voluminous disclosure. One skilled in the art could, by following the teaching of the invention here described, select the proper reactants and reaction conditions to provide a useful composition for his purpose. While the character of this invention has been described in detail this has been done by way of illustration rather than limitation. It would be apparent to those skilled in the art that numerous modifications and variations of the illustrative examples can be made in the practice of the invention within the scope of the following claims.

I claim:
1. A fuel composition comprising a major amount of a liquid hydrocarbonaceous fuel and in an amount sufficient to provide engine cleanliness a hydrocarbylaminopolymethylenesulfonic acid, wherein said hydrocarbyl group contains at least about 30 carbon atoms.
2. A fuel composition according to Claim 1 wherein said hydrocarbylamino group is derived from a hydrocarbyl-substituted polyamine.
3. A fuel composition according to Claim 2 wherein said hydrocarbyl group is derived from a polyolefin, itself derived from $C_2$-$C_6$ olefins, with the proviso that ethylene is copolymerized with a higher olefin, and said polyamine is an alkylene or polyalkylenepolyamine of from 2 to 6 amino nitrogen atoms and of from 2 to 20 carbon atoms.
4. A fuel composition according to Claim 3 wherein said hydrocarbyl group is a polyisobutenyl group of from 30 to 300 carbon atoms.
5. A fuel composition according to Claim 1 wherein said hydrocarbylaminopolymethylenesulfonic acid is present in the fuel to the extent of from about 10 to 1,000 p.p.m.

References Cited
UNITED STATES PATENTS

| | | | |
|---|---|---|---|
| 2,906,613 | 9/1959 | Mills | 44—72 |
| 2,923,611 | 2/1960 | Wieland | 44—72 |
| 2,582,733 | 1/1952 | Zimmer et al. | 44—72 |
| 1,944,300 | 1/1934 | Ott et al. | 260—513 N |

DANIEL E. WYMAN, Primary Examiner

Y. H. SMITH, Assistant Examiner